United States Patent [19]

Keane et al.

[11] Patent Number: 4,760,247
[45] Date of Patent: Jul. 26, 1988

[54] OPTICAL CARD READER UTILIZING AREA IMAGE PROCESSING

[75] Inventors: Martin A. Keane, Arlington Hgts.; Charles H. Black, Des Plaines, both of Ill.

[73] Assignee: Bally Manufacturing Company, Chicago, Ill.

[21] Appl. No.: 848,665

[22] Filed: Apr. 4, 1986

[51] Int. Cl.⁴ .......................... G06K 9/00; G06K 9/78
[52] U.S. Cl. ...................... 235/454; 235/456; 235/471; 235/375; 382/61; 364/412
[58] Field of Search ............... 235/375, 386, 376, 454, 235/456, 460, 494, 487, 470, 471; 364/410–412, 400; 382/48, 23, 61, 65

[56] References Cited

U.S. PATENT DOCUMENTS

| | | | |
|---|---|---|---|
| 3,059,112 | 10/1962 | Rogal | 235/468 |
| 3,246,126 | 4/1966 | Schlieben et al. | 235/471 |
| 3,289,172 | 11/1966 | Towle | 235/471 |
| 3,786,234 | 1/1974 | Trent et al. | 364/412 |
| 3,801,775 | 4/1974 | Acker | 235/470 |
| 3,885,229 | 5/1975 | Negita | 382/61 |
| 4,032,946 | 6/1977 | Wakatsuki et al. | 364/900 |
| 4,108,361 | 8/1978 | Krause | 235/375 |
| 4,153,895 | 5/1979 | Weisbrod et al. | 235/456 |
| 4,300,123 | 11/1981 | McMillin et al. | 235/456 |
| 4,384,272 | 5/1983 | Tanaka et al. | 382/65 |
| 4,403,339 | 9/1983 | Wevelsiep et al. | 382/61 |
| 4,471,217 | 9/1984 | Engel | 235/487 |
| 4,499,597 | 2/1985 | Alves | 382/48 |
| 4,566,126 | 1/1986 | Miyagawa et al. | 382/61 |
| 4,633,507 | 12/1986 | Cannistra et al. | 382/61 |

Primary Examiner—Raymond F. Cardillo
Assistant Examiner—Robert A. Weinhardt
Attorney, Agent, or Firm—Mason, Kolehmainen, Rathburn & Wyss

[57] ABSTRACT

An optical card reader for reading marks made on the face of a preprinted card utilizes a video camera and a memory device to capture and store an image of at least a portion of the card. Positioning indices are printed on the card, and the reader has stored therein information defining possible locations of valid marks relative to the positioning indices. The centroids of the positioning indices on the cards are determined to define the possible locations of valid marks on the cards. The densities and centroids of the marks located in the possible locations are analyzed to determine if a valid mark is present.

12 Claims, 3 Drawing Sheets

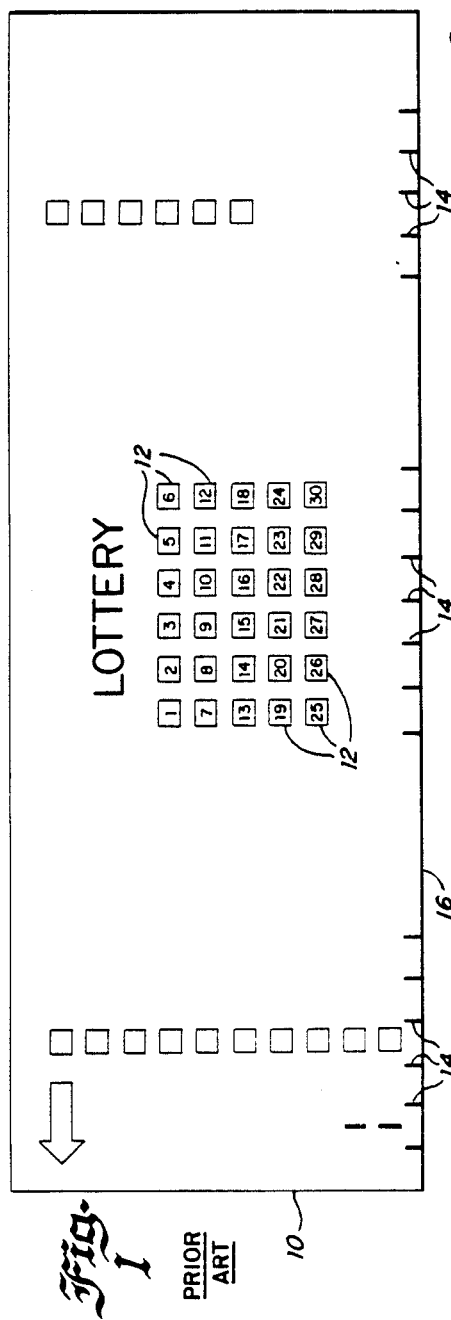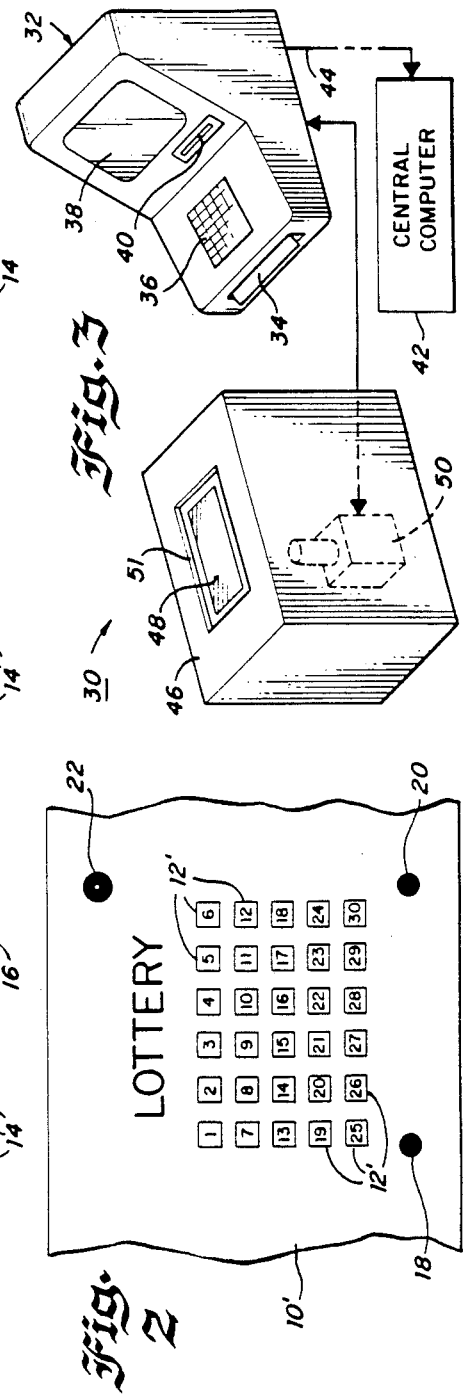

Fig. 8
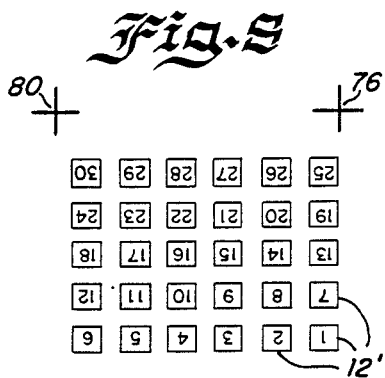
Fig. 9
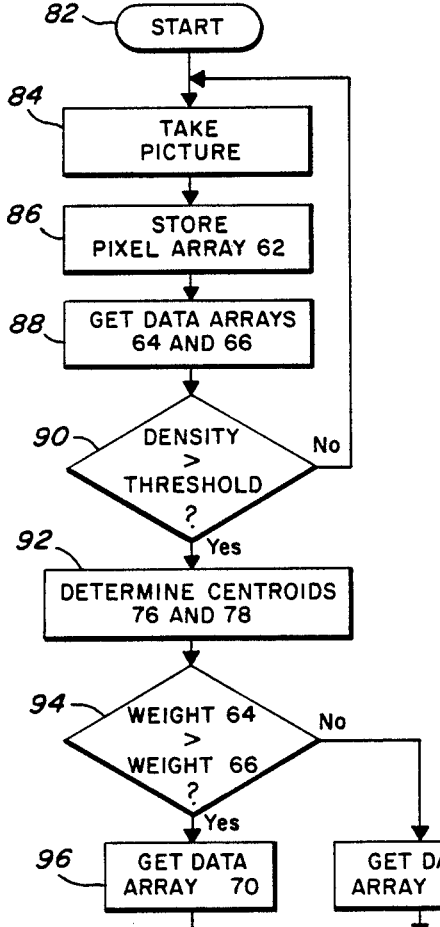
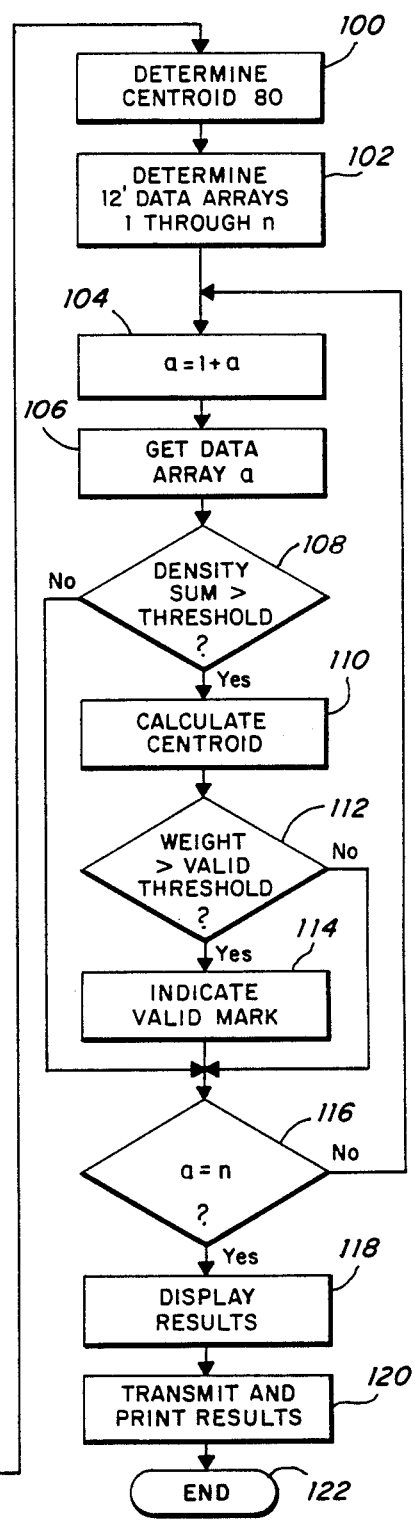

OPTICAL CARD READER UTILIZING AREA IMAGE PROCESSING

BACKGROUND OF THE INVENTION

1. Field of the Invention

This invention relates generally to optical readers, and more particularly to readers capable of reading documents of the type that have markable areas located thereon wherein each of the markable areas contains a plurality of markable locations that may be selectively marked by a writing instrument. Examples of such documents are cards of the type used in state lotteries wherein the player selects certain numbers in a lottery by marking locations on the card corresponding to his choice of lottery numbers. Examples of machines for reading such cards are lottery ticket terminals that have OMR readers (optical mark sense readers) that read such cards and issue tickets bearing the corresponding lottery numbers.

2. Description of the Prior Art

Readers for reading manually marked cards are known. Among such readers are readers generally known as optical mark sense (OMR) readers that have a plurality of sensors disposed within a reading station. The card is passed through the reading station and the presence of a mark is detected as it passes beneath the sensor. Examples of such readers are disclosed in U.S. Pat. Nos. 4,108,361 and 4,032,946.

Other systems scan the card to be read with a video camera or a line scanner to obtain a pattern of light and dark areas, and process this pattern to identify the data on the card. Examples of such systems are disclosed in U.S. Pat. Nos. 3,059,112, 3,246,126, 3,289,172, 3,786,234 and 4,471,217.

While the aforementioned readers do provide a way to read manually markable cards, the OMR type of reader suffers from the disadvantage that the markable locations must be very closely registered with the physical edges of the card, thus requiring highly accurate and costly printing and cutting operations. Also such readers require mechanical transporting mechanisms with close tolerances that are expensive to manufacture and maintain. Another disadvantage of OMRs is that they require some skill on the part of the operator and time to orient the card properly.

Time can be critical in lottery applications where, for example, in the case of popular lottery games the level of sales is often dependent on the efficiency of the agent and terminal in accepting lottery tickets.

The prior art optical scanning types of devices tend also to be complex, expensive, error prone and are subject to similar operator limitations.

SUMMARY OF THE INVENTION

It is therefore an object of the present invention to provide a low cost optical document reader that is capable of accurately reading manually marked locations on a card with a minimal requirement for physical orientation of the card.

It is another object of the invention to provide an optical card reader particularly usable for automatically reading manually marked lottery tickets without operator (e.g. sales agent) intervention.

It is a further object of the invention to provide an optical card reader that places at least a portion of the card image into computer memory for both orientation and reading.

It is an additional object of the present invention to provide an optical card reader for use with a lottery ticket sales terminal that reads cards presented by a customer and eliminates many card orientation requirements.

It is another object of the present invention to provide a card reader capable of reading markable areas on a card without requiring accurate registration between the markable areas and the edges of the card.

It is another object of the present invention to provide a low cost and accurate card reader requiring little skill on the part of the user.

It is another object of the present invention to provide an improved card reader useful for a variety of applications.

In accordance with a preferred embodiment of the invention, there is provided a platen over which the card to be read is placed. A video camera captures the image of at least a portion of a card placed on the platen and stores pixel data in a memory corresponding to the area scanned by the video camera. The stored data is analyzed to locate positioning indices that were printed on the card at a higher density (i.e., density apparent to the video camera) than the density of other printing on the card in the area of interest. Stored within the reader is data defining the position of each markable location on the card relative to the position of the positioning indices. The centroid of each of the positioning indices detected in the captured stored data is determined. Based on the location of these centroids and the stored data defining the positions of the markable locations relative to the positioning indices, the position within the stored data of each of the markable locations on the card is determined. Each of the markable locations is then examined to determine whether it contains a mark. To assure greater accuracy, each of the positioning indices comprises two concentric areas of differing optical densities, and the centroid of each of the inner areas is used to define the position of the corresponding positioning index. The positioning index positions thus defined are then used to determine the positions of the markable locations. When analyzing each of the markable locations for the presence of marks, both the weight and centroid of any mark appearing in a markable locations is considered before a decision is made as to the presence of a valid mark.

DESCRIPTION OF THE DRAWING

These and other objects and advantages of the present invention will become readily apparent upon consideration of the following detailed description and attached drawing wherein:

FIG. 1 is a drawing of the face of a markable card of the type read by a prior art OMR device;

FIG. 2 is a drawing of a portion of a card similar to the card illustrated in FIG. 1 but adapted to be read by the card reader according to the present invention;

FIG. 3 is a generalized diagram showing a lottery ticket sales terminal utilizing the card reader according to the present invention;

FIG. 8 is a representation of an array of markable areas scanned by the system according to the invention relative to the determined positioning indices; and FIG. 9 is a flow chart representing the logical steps performed by the processor in the card reader of FIG. 4.

DETAILED DESCRIPTION

Figure 4:
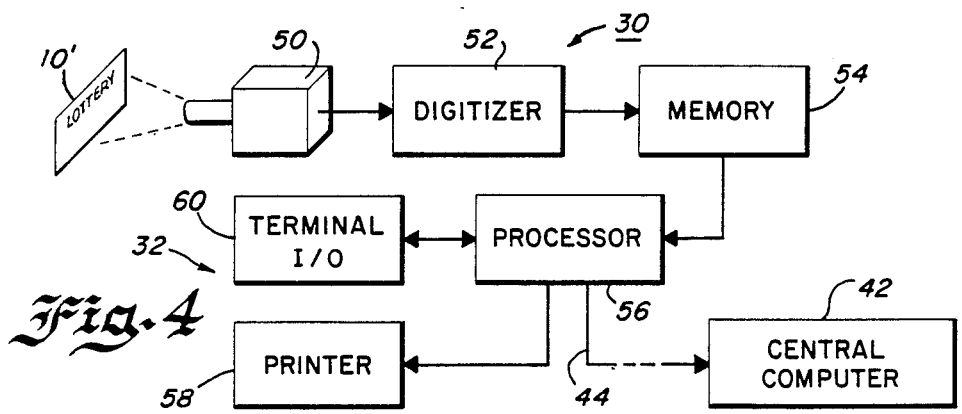
FIG. 4 is a block diagram of the card reader according to the present invention.

Although the present invention will be described in the environment of a lottery ticket sales terminal, it should be understood that it is also applicable to other devices that read cards or other documents having defined markable areas thereon, such as a fast food menu, an election ballot, etc.

Referring now to FIG. 1, there is shown a lottery card 10 of the type read by the prior art OMR reading devices. The card 10 has a markable area containing a plurality of markable locations 12 that are selectively marked by the player using a pen or pencil or other writing instrument to indicate his bet selections. After the bet selections have been made, the player takes his card to a lottery ticket sales terminal wherein the card is read and lottery tickets having numbers corresponding to the player's selections marked on the card 10 are printed. However, in order for the OMR device to read the card 10 accurately, the OMR device must be provided with timing and position information. This information is provided by a plurality of marks 14 typically disposed along one edge, such as the edge 16 of the card. These timing and position marks 14 provide the OMR reader with information defining the position of the markable locations 12 along the direction of travel of the card 10 as it passes through the OMR reader, i.e., in the horizontal direction of FIG. 1. The edge 16 registers the card with respect to the sensors of the OMR reader so that each row of printable locations 12 passes under an associated sensor. This requires accurate registration of the printing on the card 10 and the edge 16 of the card 10, thereby requiring precision printing and cutting operations during the manufacture of the card 10 to prevent misregistration and the resultant reading errors that can occur from such misregistration. Such readers also require accurate mechanical alignment of the OMR components which adds to the cost.

In order to avoid the necessity for accurate registration between the printed information on the card and the cut edge of the card, and to avoid the need for high precision mechanical transport mechanisms, the system according to the present invention utilizes a modified card 10', illustrated in FIG. 2. The card 10' illustrated in FIG. 2 is similar to the card 10 illustrated in FIG. 1 in that it has an area containing a plurality of markable areas 12', but it also contains a plurality of positioning indices 18, 20 and 22. However, unlike the card 10, the area of markable locations 12' need not be registered with any edge of the ticket 10'. Rather, the markable areas 12' are registered with the positioning indices 18, 20 and 22. The registration between the positioning indices 18, 20 and 22 and the markable locations 12' is relatively easy to achieve since both the positioning indices 18, 20 and 22 and the markable areas 12' are produced during the printing process, and the registration is not affected by the cutting process.

Referring to FIG. 3, a terminal, such as, for example, a lottery ticket sales terminal, generally designated by the reference numeral 30 is illustrated. The terminal 30 contains a control console 32 that is operated by a sales clerk who sells the lottery tickets. To facilitate such sales, the control console 32 contains a cash drawer 34, a manually operable keyboard 36, a visual display, such as a cathode ray tube CRT 38, and a slot 40 from which lottery tickets are issued. The control console 32 communicates with a central computer 42 via a telephone line or other data link 44. The control console 32 also communicates with an image acquisition unit 46 that contains a transparent platen 48 and a video camera 50 or similar device that captures an image of the area of interest of the card to be read and supplies the image data to the control console 32 for further processing. The card is either manually or automatically positioned relative to the camera. Alternatively a mechanical transport can be used to transport the card past the camera. A frame 51 limits the range of physical movement of the card to be read with respect to the platen 48. Although shown as a separate unit, the acquisition unit 46 can be within the control console 32.

Thus, whenever a customer wishes to purchase lottery tickets, he simply tenders to the clerk the appropriate amount of money. The clerk then enters into the control console 32 the number of cards 10' to be read corresponding to the amount of money tendered, thereby enabling the image acquistion station 46. Cards containing the selected numbers are then successively placed over the platen 48. The cards are automatically read and tickets containing numbers corresponding to the numbers read from the cards are issued from the slot 40 to the customer. Data of the transaction is sent to the central computer 42 via the data link 44 to provide verification of the transaction.

Referring now to FIG. 4, an area of the lottery 10' containing the markable areas 12' and the positioning indices 18, 20 and 22 is scanned by the video camera 50 or other imaging device such as, for example, a charge coupled imaging device (CCD). The analog output of the video camera 50 is applied to a digitizer 52, which may be a commercially available digitizer such as, for example, a digitizer device manufactured by Chorus Data Systems. The digitizer may be located external to the camera as shown, or may be located within the camera such that the camera provides a digitized signal directly. The function of the digitizer 52 is to convert the analog video signal to a digital signal suitable for storage in a memory. Thus, the digitizer samples each pixel of the video image signal and assigns a number representative of the relative darkness (gray levels) of each pixel. The density defined by the numbers defining the relative lightness or darkness of the various pixels need not conform to the relative lightness or darkness as perceived by the human eye. Rather the term "density" as used herein is intended to mean an apparent density produced by the video camera. This apparent density is not only a function of the density of the printing on the card, but also of other factors such as the color of the printing on the card, the color of the illumination source, the frequency response of the video camera and other factors such as the characteristics of any filters that may be interposed between the card and the video cameras. The numbers defining the relative lightness or darkness (density) of the pixels is stored in a memory 54, such as a random access memory RAM 54.

In the present embodiment, a 400 by 640 array of pixels is digitized and stored; however, different sized arrays may be used depending on the configuration of the card as well as the size and density of printing on the card being read. Also, more than one array may be used if multiple areas on the card are to be read. Such areas may indicate, for example, that a computer picked selection of numbers is being requested and the dates of the lotteries that the participant desires to play as well as other data.

After the stored card image has been properly oriented in the memory 54, for example, by the use of positioning indices as described below, the stored array of pixel density defining data is utilized by a microprocessor 56 to determine which of the markable areas 12' of the card 10' have been marked. To identify the presence of a valid mark, the microprocessor 56 sequentially examines data sub-arrays within the memory 54 corresponding to the matrix of 1 through 30 markable areas 12' as follows. Initially the sum of the density values of the pixels within each sub-array is compared to a predetermined preliminary threshold value. When a particular markable area 12' is unmarked or possibly includes only a stray mark or dirt smudge, the sum of the density values will be less than the preliminary threshold value. If this sum is less than the preliminary threshold value, the presence of a valid mark is not indicated, and further analysis of the sub-array corresponding to that particular markable area 12' is not necessary.

If desired, a preliminary filtering step may be utilized prior to the summing of the densities of the individual pixels. In such a filtering step, the density of each pixel would be compared with a predetermined threshold and those pixels below the threshold would have their density values set to zero. For those above the threshold could retain their density value or could have their density value set to a predetermined fixed value, prior to summing.

If the sum is greater than the preliminary threshold value, thus indicating the possible presence of a valid mark, then both the centroid and a weight of the pixel density values within the examined markable area 12' is calculated. The centroid is calculated by multiplying X and Y position values for each pixel within the markable area 12' by its density value, separately summing the values thus obtained and then dividing both the X and Y sums by the total sum of the density values. The weight of each sub-array is equal to a constant multiplied by the sum of the pixel densities within the sub-array divided by a defined area, generally corresponding to the area of a markable area 12'. An offset or deviation from a defined center of the markable area 12' is determined for the calculated centroid. A validity threshold value is then determined utilizing the calculated centroid deviation such that the validity threshold value is proportionally higher for higher calculated centroid deviations. The calculated weight is compared to the resulting validity threshold value. When the calculated weight is greater than the validity threshold value, a determination is made that a valid mark is present within the particular markable area 12'. Otherwise when the calculated weight is less than the resulting validity threshold value, a valid mark is not indicated. The reason for requiring a higher validity threshold at greater centroid deviations is to reduce ambiguity when a mark extends beyond a markable area or into another markable area. By using both density and position information, marks remote from the center of a markable area are not given as much consideration as those near or at the center. Alternatively, a fixed threshold can be used, and those marks whose centroid deviation exceeds a predetermined value can be ignored regardless of their weights.

Thus, the processor 56 evaluates each of the marked areas 12' of the card 10' and causes a printer 58 to print a ticket having the participant's choice of numbers printed thereon. The processor 56 also transmits data defining the transaction to a central computer for subsequent verification of a winning ticket. Although various microprocesser devices having standard capabilities can be employed for the processor 56, a 16-bit high density, n-channel metal oxide semiconductor (HMOS) microprocessor such as, for example, an Intel 8086 microprocessor, or a Motorola type MC68000 microprocessor may advantageously be employed. An input/output terminal 60 which may include the keyboard 36 and the cathode ray tube (CRT) display 38 is used to control and monitor the operation of the processor 56.

Figure 5:
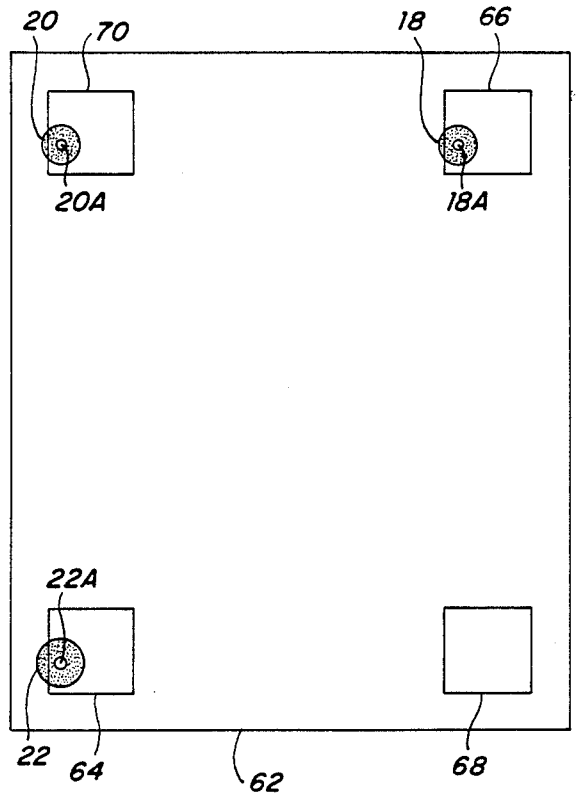
FIG. 5 is a representation of the areas scanned by the system according to the invention to determine the location of the positioning indices.

The overall scanned area, for example, corresponding to the stored 400 by 640 array of pixel data is represented as a frame or border 62 in FIG. 5. Within the border 62 are a plurality of scanning areas 64, 66, 68 and 70 that are used to locate and identify the positioning indices 18, 20 and 22. These positioning indices are used to orient the portion of the card image stored in memory 54 containing the markable area 12'.

When the card 10' is placed on the platen 48, the three positioning indices 18, 20 and 22 will appear within three of the four scanning areas 64, 66, 68 and 70. This occurs because the sizes of the platen 48 and the frame 51 are selected to constrain the physical movement of the card 10' and the sizes of the scanned areas 64, 66, 68 and 70 are large enough so at least the central portion, preferably including the centroid, of the positioning indices 18, 20 and 22 will appear within three of the four scanning areas over the range of physical movement of the card 10' with respect to the platen. Also, the sizes of the scanned areas 64, 66, 68 and 70 are large enough to provide for certain tolerances in the lateral and rotational orientation of the card 10'.

After the image of the card 10' has been digitized and stored in the memory 54, locations within the memory 54 corresponding to two of the scanned areas 64 and 66 are examined to determine the presence of one of the positioning indices 18 and 22. This is done by comparing the densities of the various pixels within the scanned areas 64 and 66 with a predetermined threshold value to determine if enough of the pixels have a density that is high enough to indicate the presence of a positioning index. If the compared densities are less than the predetermined threhold value, the system assumes that the card 10' has not been properly positioned on the platen 48 and will generate a message on the CRT 38 to that effect. Thus, after a predetermined time when the card is repositioned on the platen 48, the card 10' is scanned again by the video camera 50.

If a card 10' has been properly positioned on the platen 48, the index 18 will always appear in one of the scanning areas 64 or 66 and the index 22 will appear in the other scanning area depending on the orientation of the card. The index 20 will appear in one of the scanning areas 68 or 70, also depending on the orientation of the card 10'. In the example illustrated in FIG. 5, the image of card 10' is rotated 180° with respect to the orientation shown in FIG. 2 so that the index 18 appears in the scanning area 66 and the index 22 appears within the scanning area 64.

As previously stated, if the card 10' is properly positioned on the platen 48, at least the central portion of the two scanning indices 18 or 22 will always be present within the scanning areas 64 and 66, and consequently, those two areas will be evaluated for the presence of indices before the areas 68 and 70 are considered. The areas are evaluated by observing each pixel within the scanning areas 64 and 66, and if the weight of the pixels in the scanning areas 64 and 66 exceeds a predetermined number, the presence of an index is indicated. In addition, the location of the centroid of the scanned index 18 or 22 within each of the scanned areas 64 and 66 is determined. The purpose of determining the centroid will be discussed in a subsequent portion of the specification.

In order to obviate the need for analyzing both of the scanning areas 68 and 70 for the presence of an index, and in accordance with another important aspect of the invention, the indices 18 and 22 are made unequal in size. Because of this, the total weight of the pixels in the scanning area having the larger index will be greater than in the scanning area having the smaller index, and thus, it is possible to determine the orientation of the card 10'. For example, if, as illustrated in FIG. 5, the index 22 is present in the area 64 and the index 18 is present in the area 66, it will be reflected by a greater total weight of the pixels in the area 64 relative to that of the area 66. This will indicate that there is no index present in the area 68 because the larger index 22 has no index spaced horizontally from it, and that the index 20 must be present in the scanning area 70. Thus, only the scanning area 70 need be evaluated. The data corresponding to the area 70 is evaluated in the same manner as the data for the areas 64 and 66, that is, the density of each pixel and the location of the centroid of the densities in area 68 or 70 is calculated.

In accordance with another important aspect of the present invention, once the location of the centroid of the densities of the pixels in each of the scanning areas containing an index has been determined, a reduced size scanning area is defined about the centroid. For example, in the case illustrated in FIG. 5 wherein the size of the scanning areas 64, 66, 68 and 70 is on the order of 60 by 60 pixels, the reduced scanning area could be a 30 by 30 array of pixels.

Figure 6:
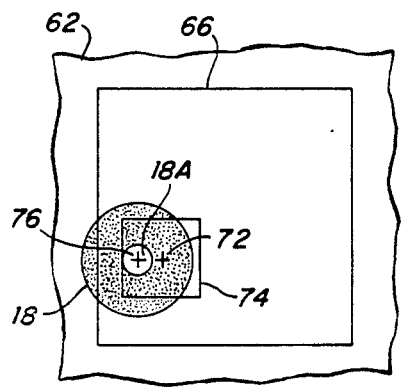
FIG. 6 is an enlarged representation of one of the areas scanned to determine the location of the positioning indices showing a second reduced scanning area.

Referring to FIG. 6, the scanning area 66 containing the index 18 is illustrated in greater detail. The centroid of the pixels within the area 66 is indicated by a cross 72. A reduced scanning area 74 is disposed about the centroid 72, with the centroid 72 being at the center of the scanning area 74. Such a reduced scanning area is defined for each of the scanning areas containing an index.

Once the reduced scanning area 74 has been defined, it is evaluated for the presence of a low density area such as the white area 18A, 20A and 22A that is present in each of the three indices 18, 20 and 22. This is accomplished by scanning the area 74 for areas that are lighter than a predetermined threshold. Once this has been done, the centroid of the light areas is determined, and is indicated by a cross 76 in FIGS. 6 and 7. The centroid of each of the white areas of the indices 18, 20 and 22 is determined in a like manner. These centroids of the white areas 18A, 20A and 22A are used to provide position references whereby the markable areas 12' may be located with respect to the references. For example, in the embodiment illustrated, lines drawn between the centroids of the white areas 18A and 20A of the indices 18 and 20 and between those of the indices 20 and 22 intersect at a right angle, thereby providing a coordinate system for the location of the markable areas 12'. Although a right angle coordinate system has been selected for convenience, other coordinate systems may also be used, but once the coordinate system has been established, a matrix of scanning areas corresponding to each of the markable areas 12' may be established. Such scanning areas can then be evaluated to determine the absence or presence of a mark in each area in order to determine the selections of the participant as described above.

Figure 7:
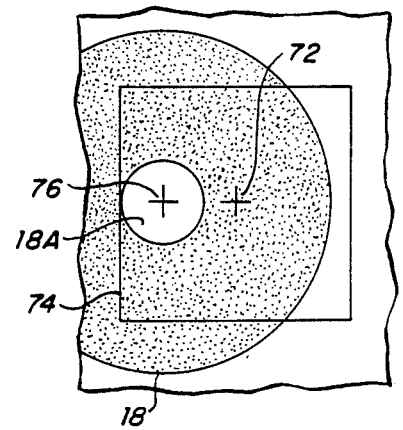
FIG. 7 is an enlarged representation of the reduced scanning area of FIG. 6.

For example, a matrix of scanning areas corresponding to the markable areas 12' is illustrated in FIG. 8. As is shown in FIGS. 5-7 relative to the index 18, the centroid of the white area 18A within the index 18 is shown by the the cross 76 in FIG. 8. Similarly, crosses 78 and 80 represent the centroids of the white areas 22A and 20A, respectively. The locations of centroids 76, 78 and 80 is utilized for identifying a plurality of data arrays corresponding to the matrix of markable areas in the area 12'. For example, each data array corresponding to each different one of the matrix of markable areas having numbers as 1 through 30 in FIG. 8 is on the order of a 30×30 array of pixels.

The operation of the card reader 12 will now be described with reference to the flow chart shown in FIG. 9. The program starts from an idle condition indicated by a start block 82. The sequence begins with taking a picture, as indicated in a block 84, of the image carried on the portion of the card 10' within the border 62 (FIG. 5) by scanning the card portion 62 with the video camera 50. The reference numerals used for in the flow chart in FIG. 9 correspond to the reference numerals in FIGS. 5, 6 and 7. The exampled 400×640 array 62 of pixels is digitized and stored, as indicated in a block 86. Next data arrays 64 and 66 are utilized as indicated in a block 88. Data arrays 64 and 66 are evaluated by comparing the sum of the densities of the pixels with a predetermined threshold value, as indicated in a block 90. When the compared sums are less than the predetermined threshold value, the card 10' has not been properly positioned on the platen 48 and must be repositioned and scanned again by the video camera 50. Otherwise for a properly positioned card 10', a centroid is determined for the two-dimensional data arrays 64 and 66 as before described and as indicated in a block 92.

After the centroids 76 and 78 are determined, the weight of each of the arrays 64 and 66 is calculated. Then the calculated weights of the arrays 64 and 66 are compared, as indicated in a block 94. If the weight of array 64 is greater than the weight of array 66, then the array 70 is evaluated as indicated in block 96; otherwise, the array 68 is evaluated, as indicated in a block 98. The location of the centroid 80 is then determined from the appropriately selected array 68 or 70, as indicated in a block 100.

Next, the 12' data arrays 1 through n (1 through 30 in the illustrated example) are identified utilizing the centroids 76, 78 and 80, as indicated in a block 102. Each of these 12' data arrays 1 through n are then sequentially evaluated to identify the presence of a valid mark, as indicated in a sequence of blocks 102, 104, 106, 108, 110, 112, 114 and 116. First the particular markable area 12' is evaluated for the presence of a preliminary threshold density sum indicating the possible presence of a valid mark, as indicated in the block 108. When the density sum of the evaluated markable area 12' is greater than the preliminary threshold value, a centroid is calculated for the particular markable area 12' as indicated in the block 110. Otherwise, a next markable area is evaluated, as indicated by returning to the block 104.

After the centroid is determined (block 110), a threshold weight value is calculated for the particular 12' markable area and the calculated weight is compared with the threshold value, as indicated in the block 112. When the calculated weight is greater than the threshold value a valid mark is indicated, as indicated in a block 114. Otherwise, the sequential markable area 12' evaluation is repeated for a next markable area 12' for each of the 1 through 30 markable areas in the area 12' of the card 10'.

After each of the 12' markable areas 1 through 30 have been evaluated, the valid marks identified are displayed on the CRT display 38 as indicated in a block 118, and printed on a ticket, as indicated in a block 120, that is issued to the participant. Additionally, the valid mark data for the issued ticket is transmitted (block 120) to the central computer 42 (FIG. 3). The sequence ends as indicated at a block 122.

In the embodiment discussed above, a predetermined area containing both the position indices and the markable areas is scanned and stored in memory. Once the data has been stored, the locations in memory of the positioning indices are determined. These positioning indices are then used to define a coordinate system from which the positions in memory of the various markable areas may be determined so that the absence or presence of a mark in those areas could be ascertained. However, in an alternative embodiment, a two step scanning process may be employed. In such a scanning process, the ticket may be scanned first to locate the positions of the positioning indices on the card. As previously discussed, the positioning indices could be identified on the basis of density (or apparent density as seen by the camera). The position indices and their locations can be stored in memory, and their centroids determined as previously discussed. Once the centroids are known, the sub-arrays corresponding to the various markable areas can be calculated and the markable areas of the ticket corresponding to those sub-arrays areas can be scanned in a second scanning sequence to determine which of the markable areas contain marks.

Although the present invention has been described in connection with details of the preferred embodiment, many alterations and modificatons may be made without departing from the invention. Accordingly, it is intended that all such alterations and modifications may be considered as within the spirit and scope of the invention as defined in the appended claims.

What is claimed is:

1. An optical reader for reading cards having printed thereon positioning indices and having an area containing a plurality of markable areas, comprising:

means for storing data defining the positions of the markable areas relative to the centroids of the positioning indices;

means for capturing and storing an image of said positioning indices and said area containing said markable areas;

means responsive to said captured image for determining the positions of the centroids of the positioning indices on the captured image;

means responsive to the position of the centroids on the captured image and stored data defining the positions of the markable areas relative to the centroids for defining the markable areas locations on the captured image;

means for analyzing each of the markable areas of said captured image to determine the presence of a valid mark thereon; said analyzing means including means for determining the density profile of each of said markable areas, means responsive to the density profiles for determining the centroids thereof; means responsive to the density profiles for determining the weights thereof; and means responsive to the weights and centroids of the density profiles for indicating a valid mark if the weight exceeds a predetermined value and the centroid lies within one of said markable areas on said captured image.

2. An optical reader for reading cards having printed thereon positioning indices and having a markable area containing a plurality of markable areas, comprising:

means for storing data defining the positions of the markable areas relative to the centroids of the positioning indices;

means for capturing and storing an image of said positioning indices;

means responsive to said captured image for determining the positions of the centroids of the positioning indices on the captured image;

means responsive to the position of the centroids on the captured image and stored data defining the positions of the markable areas relative to the centroids for defining the markable areas on the card;

means for scanning the markable areas on the card defined by said markable area defining means;

means for analyzing each of the scanned markable areas to determine the presence of a valid mark thereon; said analyzing means including means for determining the density profile of each of said markable areas, means responsive to the density profiles for determining the centroid thereof, means responsive to said density profile for determining the weight thereof, and means responsive to the centroid and weight for indicating a valid mark if the weight of said density profile exceeds a predetermined value and the centroid thereof lies within a predetermined distance of one of said markable locations on said captured image.

3. An optical reader for reading documents having data and positioning indices disposed thereon, the locations of the positioning indicies having a predetermined spatial relationship to said data, the positioning indices having areas of first and second characteristics, comprising:

means for scanning said positioning indices and determining the locations of the centroids of the areas of the first characteristic;

means responsive to the locations of the centroids of the areas of the first characteristic for determining the locations of the centroids of the areas of the second characteristic, the locations of the centroids of the areas of the second characteristic defining the locations of the positioning indices; and means responsive to the locations of the positioning indices for determining the location of the data.

4. An optical reader as recited in claim 3 wherein said first and second characteristics of said positioning indices are first and second densities and said reader includes means for determining the densities of said first and second areas.

5. An optical reader as recited in claim 4 wherein the value of the density of one of said first and second areas is unique to said positioning indices, said optical reader including means responsive to said value for identifying said positioning indices.

6. An optical reader for reading cards having a markable area disposed thereon, comprising:
means for scanning said markable area and providing pixel data representative of the density of each pixel in the markable area;
means for combining the pixel data to provide a combined value;
means responsive to said pixel data for determining the location of the centroid thereof;
means for determining the deviation of the location of the centroid from the center of the markable area; and
means responsive to the combined value and to said deviation for defining a valid mark within said markable area only if said combined value exceeds a predetermined threshold that is a function of said deviation.

7. An optical reader as recited in claim 6 wherein said threshold increases as said deviation increases.

8. An optical reader for reading cards having a markable area disposed thereon, comprising:
means for scanning said markable area and providing pixel data representative of the density of each pixel in the markable area;
means for combining the pixel data to provide a combined value;
means responsive to said pixel data for determining the location of the centroid thereof;
means for determining the deviation of the location of the centroid from the center of the markable area; and
means responsive to the combined value and to said deviation for defining a valid mark only if said combined value exceeds a predetermined threshold and said deviation is less than a predetermined amount.

9. An optical reader for reading cards having a markable area disposed thereon, comprising:
means for scanning said markable area and providing pixel data representative of the density of each pixel in the markable area;
means for combining the first and second values to provide a combined value;
means responsive to said pixel data and to said combined value for determining the centroid of said pixel data only if the combined value exceeds a predetermined first threshold;
means for determining the deviation of the location of the centroid from the center of the markable area;
means responsive to said deviation for defining a second predetermined threshold having a value that increases as the deviation increases; and
means for defining a valid mark only if said weight exceeds said second predetermined threshold.

10. An optical reader for reading cards having a markable area disposed thereon, comprising:
means for scanning said markable area and providing pixel data representative of the density of each pixel in the markable area;
means for assigning a first value to pixels that have a density that exceeds a predetermined value and a second value to pixels whose density is below said predetermined value;
means for combining the first and second values to provide a combined value;
means responsive to said pixel data and to said combined value for determining the centroid of said pixel data only if the combined value exceeds a predetermined first threshold;
means for determining the deviation of the location of the centroid from the center of the markable area;
means responsive to said deviation for defining a second predetermined threshold having a value that increases as the deviation increases;
means for determining the weight of the pixels in the markable area; and
means for defining a valid mark only if said weight exceeds said second predetermined threshold.

11. An optical reader for reading cards having a markable area disposed thereon, comprising:
means for scanning said markable area and providing pixel data representative of the density of each pixel in the markable area;
means for combining the pixel data to provide a combined value;
means responsive to said pixel data and to said combined value for determining the centroid of said pixel data only if the combined value exceeds a predetermined threshold;
means for determining the amount of deviation of the location of the centroid from the center of the markable area; and
means responsive to the combined value and to said deviation for defining a valid mark only if said combined value exceeds a predetermined value and said deviation is less than a predetermined amount.

12. An optical reader for reading cards having a markable area disposed thereon, comprising:
means for scanning said markable area and providing pixel data representative of the density of each pixel in the markable area;
means for assigning a first value to pixels that have a density that exceeds a predetermined value and a second value to pixels whose density is below said predetermined value;
means for combining the first and second values to provide a combined value;
means responsive to said pixel data and to said combined value for determining the centroid of said pixel data only if the combined value exceeds a predetermined threshold;
means for determining the amount of deviation of the location of the centroid from the center of the markable area;
means for determining the weight of the pixels in the markable area; and
means responsive to said weight and to said deviation for defining a valid mark only if said weight exceeds a predetermined value and said deviation is less than a predetermined amount.

* * * * *